July 6, 1937.  C. L. McMULLEN  2,086,363
RECORDING APPARATUS
Filed Aug. 6, 1935   6 Sheets-Sheet 4
FIG. IV.
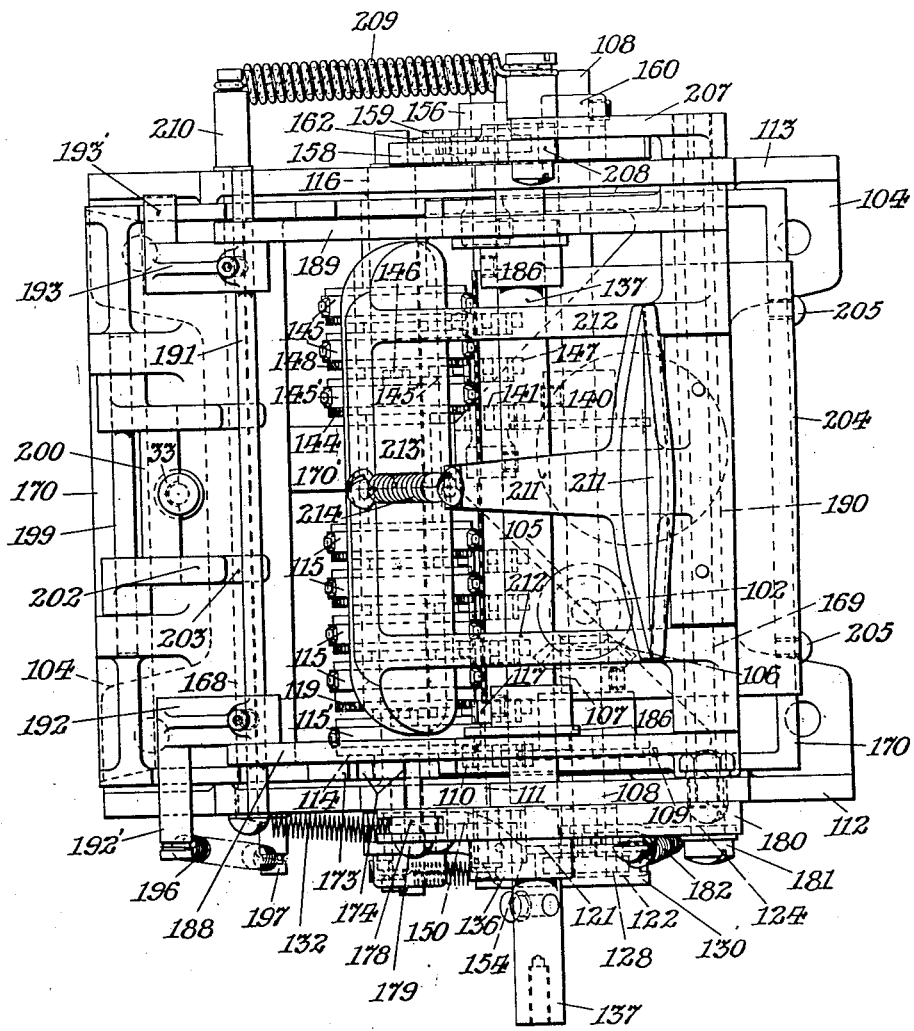
INVENTOR:
CARLTON L. McMULLEN,
BY July 6, 1937.  C. L. McMULLEN  2,086,363
RECORDING APPARATUS
Filed Aug. 6, 1935  6 Sheets-Sheet 5
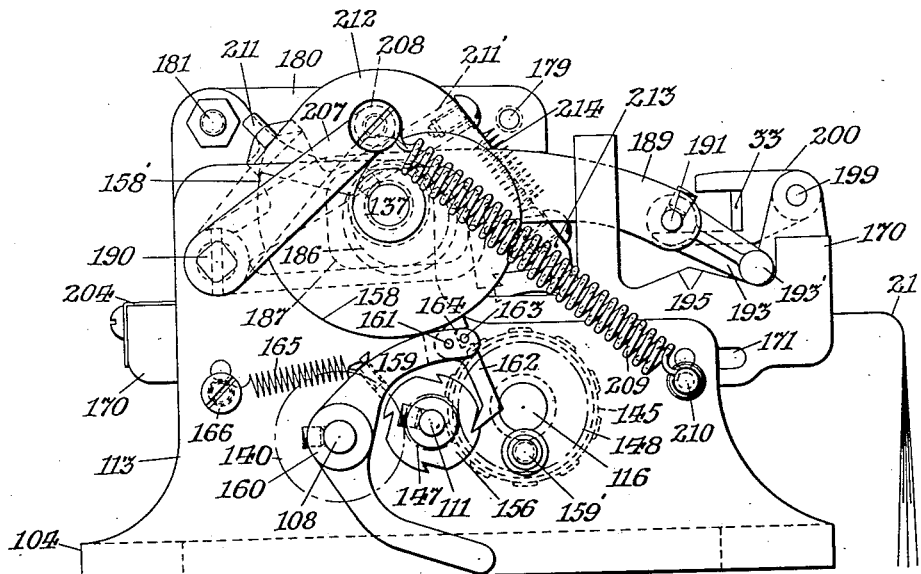
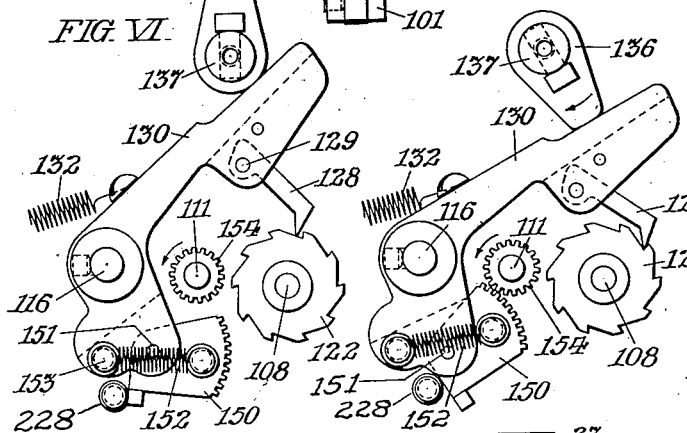
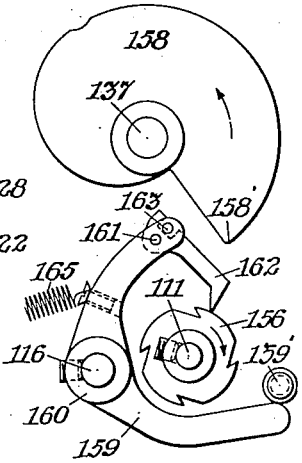
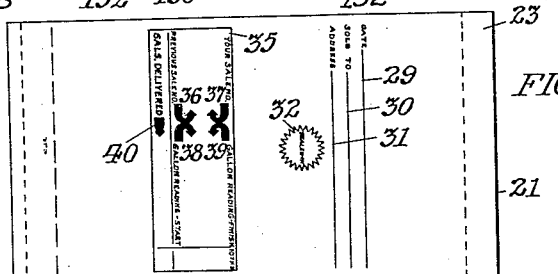
INVENTOR:
CARLTON L. McMULLEN,
BY July 6, 1937.　　　　C. L. McMULLEN　　　　2,086,363
RECORDING APPARATUS
Filed Aug. 6, 1935　　　　6 Sheets-Sheet 6
FIG. XI.
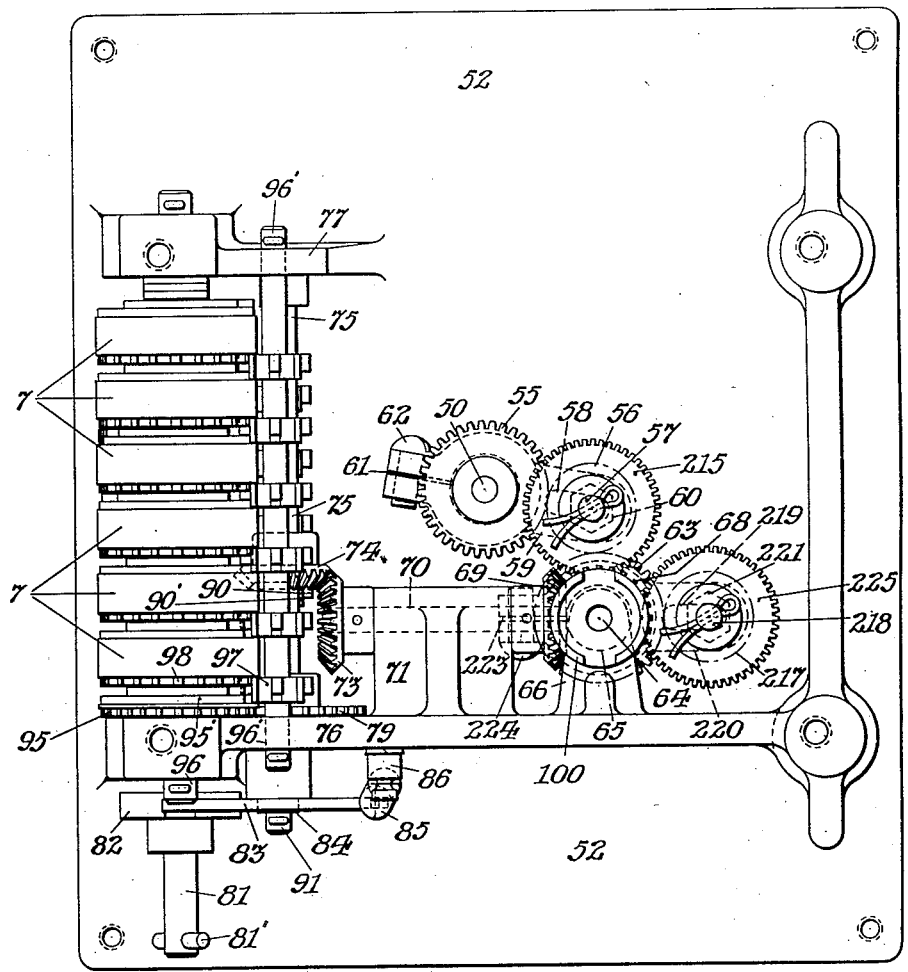
FIG. XII.
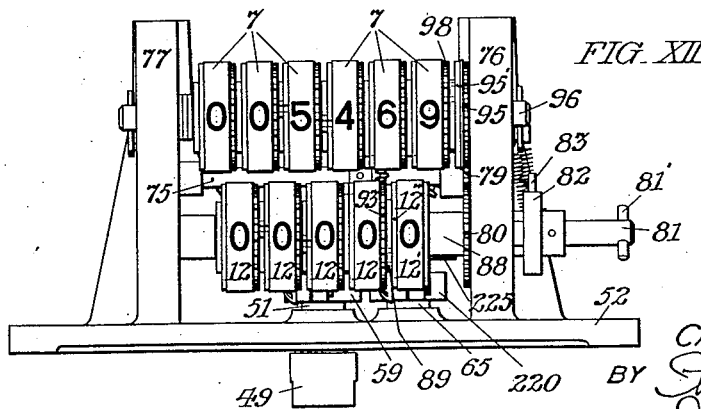
INVENTOR:
CARLTON L. McMULLEN,
BY Patented July 6, 1937

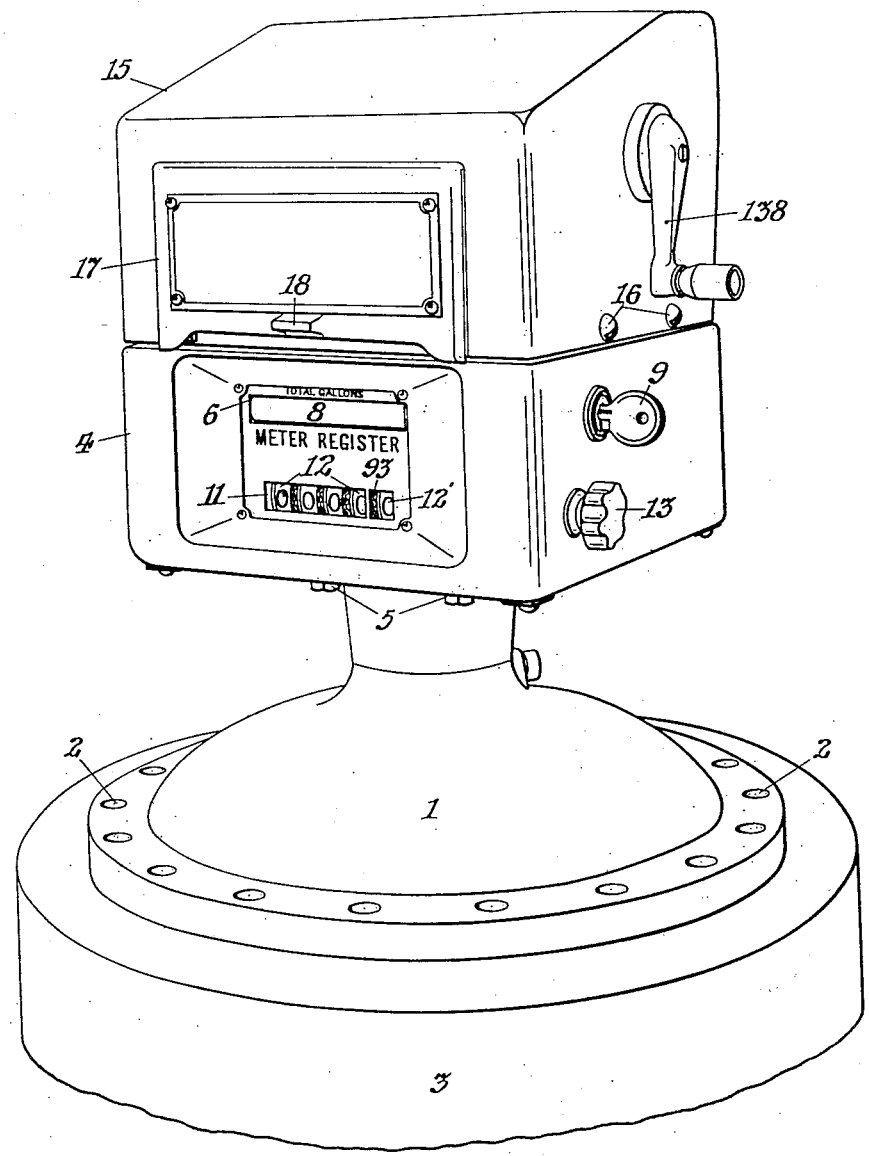

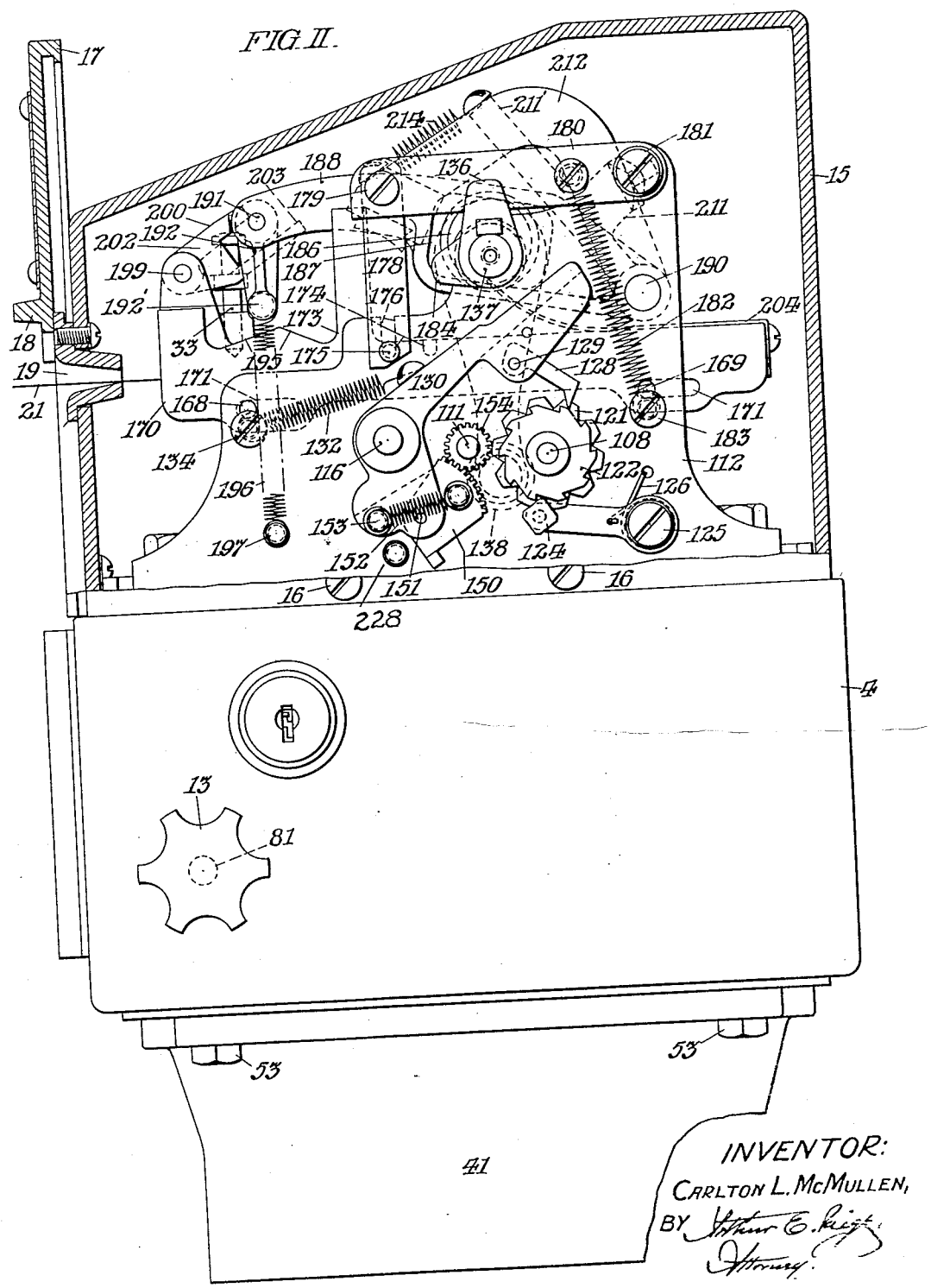

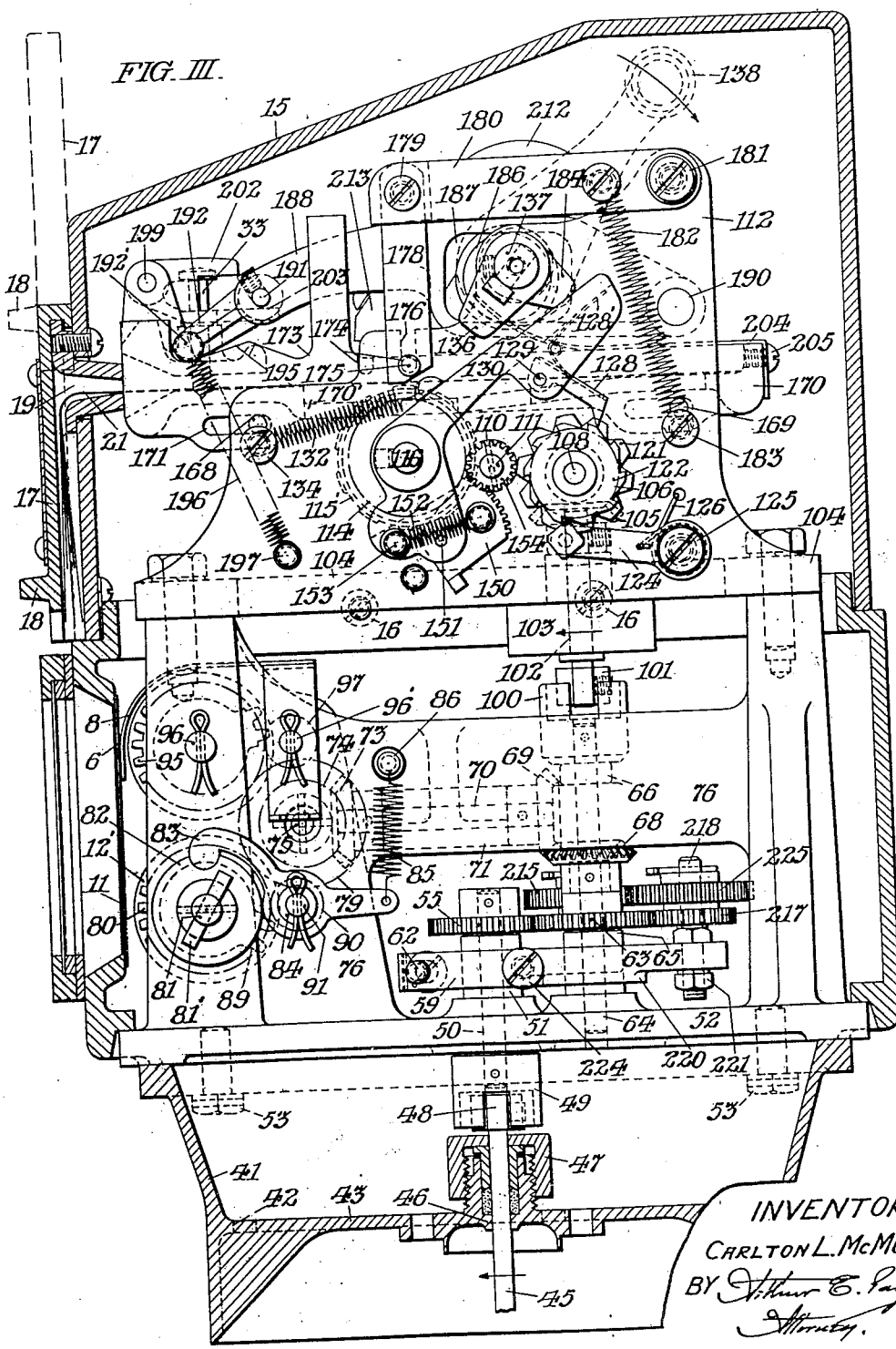

2,086,363

UNITED STATES PATENT OFFICE 2,086,363

RECORDING APPARATUS

Carlton L. McMullen, Llanerch, Pa.

Application August 6, 1935, Serial No. 34,879

5 Claims. (Cl. 234—1)

This invention is particularly applicable to apparatus including a meter through which gasolene or other fluid is forced, by a pump or other suitable means, to and through a flexible dispensing hose. Said meter is operatively connected with registering mechanism indicating the volume of fluid dispensed. In gasolene dispensing apparatus such indication is conveniently in gallons and fractions of a gallon, but in gas apparatus is preferably in cubic feet.

It is the object and effect of my invention to prevent the user of such apparatus from cheating either the owner of the fluid dispensed or the customer who buys it. To that end, I provide means for identifying each individual dispensing operation with an individual serial number and provide means to not only make a record of each such operation, and the volume of fluid dispensed thereby, for the owner of the fluid, but also duplicate that record upon a receipt for delivery to the customer; each such record and receipt having imprinted thereon not only the individual serial number of the instant transaction but also the serial number of the immediately preceding dispensing transaction, to prevent any dispensing operation without a record thereof in its consecutive order. Such record of each sales transaction is begun by imprinting simultaneously upon the owner's record and the customer's receipt the serial number of the preceding sale; that imprint being made before the initiation of the instant dispensing operation; it being impossible to imprint the serial number for the instant sale record until the dispensing operation is actually begun.

In Letters Patent of the United States No. 1,922,056 granted August 15, 1933, and No. 1,967,677 granted July 24, 1934, I disclosed recording mechanism especially designed for application to fuel oil trucks; essential features of the devices therein disclosed being that the recording mechanism is under control of the gear shift lever of the truck and includes a pair of meshed gears one of which is segmental so as to disengage itself in one position of its movement and thereby render the recording mechanism inoperative until said gear is moved from that position. In the present invention, the recording mechanism is continually operative, and may be operated at any time by manipulation of a hand lever which controls a spring pressed platen to permit the latter to come into cooperative relation with register type wheels indicating the volume of fluid dispensed and a serial number. However, the serial numbering device is so constructed and arranged that its type wheels may be advanced but one digit at each dispensing operation; detent means being provided capable of rendering said numbering device inoperative until released, by means connecting a driven element of the meter with said detent, only upon initiation of each successive operation of the meter. Such construction and arrangement prevent the operator from dispensing any liquid without setting up a serial number for that transaction and prevent the operator from setting up more than one serial number for each dispensing transaction, but permit a record to be made at any time of the position of the volume register and the serial number set up; thus preventing felonious manipulation of the registering and recording mechanism possible with some devices of the prior art.

My present invention is applicable not only to fluid dispensing trucks but to stationary dispensing apparatus, and particularly to what are known as curbstands for dispensing gasolene to automobiles. There are many types of such dispensing apparatus on the market including meters of different forms and a further object of my invention is to include in conjunction with the registering and recording mechanism above contemplated an adapter for connecting such mechanism with any form of meter, to be controlled by the latter as above contemplated. The purpose and effect of such an adapter is to connect the registering mechanism of my invention with a driven element of any fluid meter to register the volume of fluid passed through such meter at each dispensing operation. Moreover, I include what I term change gears for varying the ratio between the movement of the driven element of the meter and the registering and indicating mechanism.

My invention includes the various novel features of construction and arrangement hereinafter more definitely specified.

In said drawings, Fig. I is a perspective view of a structure embodying my invention and including manually operative printing recording mechanism, meter register mechanism for operative connection with a meter, and an adapter for supporting both of said mechanisms in connection with the meter.

Fig. II is a partial elevation of the right hand side of the structure shown in Fig. I, the casing for the upper printing recording mechanism being sectioned to show that mechanism.

Fig. III is a vertical sectional view of the registering and recording structure shown in Fig. I, taken on the axis of said structure, (but with a different form of supporting adapter at the bottom thereof,) showing the serial numbering detent devices in their normal position, detaining the numbering mechanism from advancing.

Fig. IV is a plan view of the manually operative recording mechanism indicated in the upper portion of Fig. III.

Fig. V is an elevation of said recording mechanism as seen from the rear of Fig. III and the upper end of Fig. IV.

Fig. VI is an elevation of said serial numbering detent devices indicated in Fig. III, but in released position.

Fig. VII is an elevation of said serial numbering detent devices indicated in Figs. III and VI but in an intermediate position.

Fig. VIII is an elevation of parts of the recording mechanism, as indicated in Fig. V, but in the position corresponding with the position of the detent mechanism shown in Fig. VI.

Fig. IX is a plan view of a receipt packet adapted to be used with said recording mechanism shown in Figs. III, IV, and V; which comprises three sheets to be impressed with the record imprint and having two sheets of carbon transfer paper interposed upon opposite sides of the central sheet; said packet being shown upside down with reference to the position in which it is introduced to the recording mechanism as shown in Figs. III and V.

Fig. X is an edge view of the packet shown in Fig. IX, with the sheets spread apart to indicate their relative position.

Fig. XI is a plan view of the meter register mechanism indicated beneath the recording mechanism in Fig. III.

Fig. XII is a front elevation of the register mechanism as seen from the left hand side of Fig. XI.

Referring to Fig. I, the adapter 1 serves to support the entire structure shown in said figure and is conveniently a casting having a circular series of holes 2 for screw elements to rigidly connect it with the top of a casing 3, for a fluid meter, which latter may be of any suitable form. The meter register casing 4 is rigidly connected with said adapter conveniently by the tap bolts 5 and has the window 6 at the front thereof for display of registering mechanism comprising decimally numbered wheels 7 by which the total number of gallons of liquid dispensed is manifested. Such display is normally prevented by the shutter 8, when it overhangs said window 6 as shown in Fig. III, but said shutter may be raised by turning the key 9 to uncover said window 6 and thus permit such display. The window 11 displays the decimally numbered wheels 12 for indicating the volume of liquid dispensed at a single transaction, said wheels 12 being adapted to be reset to the zero position shown in Fig. I by manual rotation of the knob 13, clockwise.

The casing 15 for the recording printing mechanism is supported by said meter register casing 4 as shown in Fig. III; said casings being normally rigidly connected by four screws 16 two of which are indicated in Fig. I and the other two in Fig. III. Said casing 15 has the door 17 which gravitates to the closed position shown in Figs. I and III whenever it is released, but may be manually uplifted to the position shown in full lines in Fig. II and in dash lines in Fig. III by means of the projecting handle lug 18, to permit the insertion through the throat 19 of the packet 21 such as indicated in Figs. IX and X. The projecting end of said packet is shown at the left hand side of Fig. III and the right hand side of Fig. V. Said packet 21 includes three sheets 23, 24, and 25 to be impressed with the record imprint and having two sheets of carbon transfer paper 26 and 27 respectively interposed upon opposite sides of the central sheet 24. Said sheet 23 is intended to be used as a receipt to be given to the customer, and said sheets 24 and 25 are duplicates which are intended for the records of the owner of the fluid dispensed.

The sheets 23, 24, and 25 of said packet 21 are conveniently imprinted as shown in Fig. IX with lines 29, 30, and 31 upon which the operator may respectively write the date of the transaction, the name of the customer, and the address of the latter. Each of said three sheets is also imprinted with a circular figure 32 representing a seal which, when the packet is in proper position in the recording mechanism, is punched at its axis by a pin 33 indicated in Figs. III and IV which is thrust through the packet to hold the latter in proper relation with the recording mechanism until the transaction is completed and it is desired to withdraw the packet from the printing mechanism. Each of said sheets of the packet is also conveniently printed with the box 35 indicated in Fig. IX containing five index pointers respectively indicated at 36, 37, 38, 39, and 40. The index pointers 36 and 37 respectively point to the serial numbers of the previous sale and the instant sale. The index pointers 38 and 39 respectively point to imprints respectively showing the number of gallons recorded at the beginning of the instant transaction as having been previously dispensed and to the number of gallons recorded at the finish of the instant dispensing operation. The index pointer 40 points to an entry written by the operator indicating the number of gallons delivered at the instant transaction.

Referring to Fig. III, the adapter 41 is conveniently rigidly connected with a subjacent meter through which fluid is dispensed, by screws extending through openings 42 in the horizontal web 43 of said adapter. The shaft 45 is operatively connected with that meter so as to be turned in the direction of the arrow shown thereon in Fig. III whenever the meter is operated to pass fluid therethrough. Said shaft is conveniently journaled in the bearing 46 and stuffing box 47 in said adapter. Said shaft carries the coupling member 48 engaged with the coupling member 49 on the shaft 50 which is journaled in the bearing 51 in the frame 52. Said frame 52 is rigidly connected with said adapter, conveniently by screws 53. Said shaft 50 carries the gear 55 which is in mesh with the gear 56 which turns freely on the shaft 57 which is radially adjustable in the slot 58 of the arm 59 in which it may be adjustably rigidly secured by the nut 60. Said arm 59 is split at 61 so that it may be clamped by the screw 62 in adjusted position on said bearing 51 of the frame 52 so that said gear 56 engages the gear 63 which is rigidly connected with the shaft 64. Said shaft 64 is journaled in the bearings 65 and 66 on said frame 52. Said shaft 64 has, rigidly connected therewith, the miter gear 68 engaging the miter gear 69 on the horizontal shaft 70 which is journaled in the bearing 71 on said frame 52. The arrangement is such that said shaft 45 makes one revolution for each gallon of fluid dispensed through the meter which actuates it and turns said shaft 70 one revolution for each gallon. Said shaft 70 carries the miter gear 73 engaging the miter gear 74 which is rigidly connected with the shaft 75 journaled in the bearings 76 and 77 on said frame 52.

Said shaft 75 is the driving shaft for the registering mechanism including said numbered wheels 12 displayed through the window 11 in Fig. I. Said shaft has rigidly connected therewith the gear 79 which meshes with the gear 80 on the shaft 81, the latter being shown in Figs. III and XI. Said shaft is journaled in the bearings 76 and 77 so that it may be turned by hand to set the registering mechanism displayed through the window 11 in Fig. I back to zero position at the end of each dispensing operation, but said shaft 81 is normally held stationary by the single toothed ratchet wheel 82 which is rigidly connected therewith and normally engaged by the detent pawl lever 83 pivoted on the stationary stud shaft 84 projecting from said bearing 76. Said lever 83 is normally held in engaged position as shown in Figs. III and XI by the spring 85 connecting its right hand end with the stationary stud 86 projecting from said bearing 76.

Said register wheels 12, indicating gallons dispensed, are mounted upon the shaft 81 to turn independently of said shaft, as hereinafter described. The register wheel 12', displayed at the right hand end of the window 11 in Fig. I, is rigidly connected with said gear 80 by the sleeve 88, shown in Fig. XII, and has the numbers "1" to "9" and "0" thereon, conveniently in red, each representing a tenth of a gallon. Said wheel 12' carries at the left hand side thereof in Figs. I and XII, two gear teeth 89 which are adapted to successively engage the eight teeth on the gear 90 indicated in Figs. III and XI, on the shaft 91 shown in Fig. III. The teeth of said gear 90 are continually in mesh with the gear 93 indicated in Fig. I and shown in Fig. XII. Every other tooth 90' on said gear 90 is extended so that what is the lower end of said gear in Fig. XI presents but four teeth, in registry with the cylindrical edge 12" on said wheel 12', so that said wheel 12 is prevented from turning by engagement of two of the four teeth 90' upon said cylindrical edge of the wheel 12' except when the latter presents its two teeth to turn the gear 90. Each of said wheels 12 is numbered like the wheel 12' but conveniently in black, and each digit thereon represents one gallon. The construction and arrangement are such that when said shaft 45 is turned one revolution, said numbered wheel 12' is turned one revolution and the two teeth carried by the latter operate to advance the adjoining numbered wheel 12 one digit, thus indicating that one gallon of fluid has been dispensed by the instant operation. The other three numbered wheels 12 in said series are similarly connected by the gears 90 and 93 so that the total number of gallons dispensed during the instant operation is manifested by the numbers on said wheels displayed at said window 11 in Fig. I.

Said gear 79 on the shaft 75 is also in mesh with the gear 95 which is loosely journaled on the shaft 96 which is stationary in said bearings 76 and 77. Said gear 95 carries two teeth for engagement with four axially long teeth on the gear 97 also loosely journaled on the shaft 96'. Said long teeth of gear 97 register with the cylindrical edge 95' on said gear 95 to prevent turning of gear 97 except when gear 95 presents its two teeth to turn the gear 97. Said gear 97 has eight teeth at its upper end in Fig. XI for engagement with the gear 98 on the decimally numbered wheel 7 so that said wheel 7 is advanced one digit for each revolution of said wheel 12' to register one gallon of liquid dispensed. Said wheel 7 which is the lowermost of the series of six in Fig. XI, is the unit wheel and is connected, by gears like the gear 97, with the other wheels 7 which respectively represent tens, hundreds, thousands, tens of thousands, and hundreds of thousands of gallons dispensed, and that series of decimally numbered wheels 7 registers the total number of gallons dispensed, aggregate of the successive individual transactions registered by the wheels 12' and 12 aforesaid.

Said shaft 81 is conveniently provided with the cross pin 81' as shown in Figs. III, XI, and XII, for engagement by clockwise rotation of the knob 13 shown in Fig. I, by which the wheels 12' and 12 are set back to their zero position after each individual dispensing operation. Such rotation of the knob 13 lifts the detent pawl lever 83 from the single tooth recess in the ratchet wheel 82; thus permitting said shaft 81 to be manually rotated the number of turns necessary to effect the restoration to their initial zero position of the five register wheels 12' and 12 which are journaled thereon. However, such movement does not move the total registering wheels 7, then held stationary by the meter.

As shown in Figs. III and XI, said shaft 64, which makes one revolution for each gallon dispensed, has fixed on its upper end the clutch member 100 for engagement with the clutch member 101 on the shaft 102 of the recording printing mechanism; which shaft 102 is journaled in the bearing 103 on the frame 104 of said recording mechanism. Said shaft 102 has fixed upon its upper end the miter gear 105 engaging the miter gear 106 on the horizontal tubular shaft 107 which is mounted to turn freely on the shaft 108 of the serial numbering mechanism hereinafter described, so that said shaft 107 turns one revolution for each gallon dispensed. Said gear 106 carries the gear 109, indicated in Fig. IV, which meshes with the gear 110 which is fixed on the shaft 111 which is journaled in the opposite side plates 112 and 113 of said frame 104. Said gear 110 has eight teeth for engagement with the gear 114 which is rigidly connected with the printing type wheel 115'. Said wheel 115' is the first of a series of five decimally numbered type wheels, loosely mounted on the stationary shaft 116 which is fixed in said side members 112 and 113 of the frame 104, and its type indicate tenths of a gallon, for recording the number of gallons and tenths of a gallon previously dispensed, by making an imprint upon the packet 21 in the space indicated by the arrow 38 in Fig. IX, and for recording the number of gallons and tenths of a gallon dispensed, at the end of the instant sales transaction, in the space on the packet 21 indicated by the arrow 39 in Fig. IX, as hereinafter described.

Said printing type wheel 115' carries upon the side thereof axially opposite to its gear 114, two teeth for engagement with the four axially long teeth on the gear wheel 117 which is like said gear 97 shown in Fig. XI. Said gear 117 is loosely journaled on said shaft 111 and said four teeth engage the cylindrical edge of the printing type wheel 115' to prevent turning of said gear 117 except when engaged by the two teeth carried by said wheel 115'. Said gear 117 has eight teeth at its upper end in Fig. IV for engagement with the gear 119 on the decimally numbered wheel 115 next to the wheel 115'; so that said wheel 115 is advanced one digit for each revolution of said wheel 115' to register one gallon of liquid dispensed. That unit wheel 115 is connected by gears like the gear 117 with the other wheels 115 which respectively represent tens, hundreds, and thousands of gallons dispensed during the instant transaction.

As shown in Fig. III, said shaft 108 has rigidly connected therewith the two ratchet wheels 121 and 122. Said wheel 121 cooperates with the pawl 124 to normally hold said shaft 108 stationary; said pawl being fulcrumed on the screw stud 125 fixed in the side member 112 of said frame 104 and provided with the spring 126 continually stressing said pawl 124 into engagement with said ratchet wheel 121. The ratchet wheel 122 has ten teeth and is turned one tenth of a revolution each time it is desired to advance the serial number one digit from the number to which the pointer 36 points in Fig. IX to the number to which the pointer 37 points in said figure. Such advancement of the serial number is effected by the pawl 128 which is pressed into engagement with said wheel 122 by the spring 128' and is fulcrumed on the pin 129 in the cam lever 130. Said lever 130 is fulcrumed on the shaft 116 which is held stationary in said side members 112 and 113 of the frame 104. Said lever 130 is continually stressed upwardly by the spring 132 extending from it to the screw stud 134 on said frame plate 112, as shown in Fig. III. Said lever 130 is in cooperative relation with the cam 136 which is rigidly mounted on the shaft 137 provided with the manually operative crank handle 138 shown in Fig. I which is used to operate said lever 130 only after the start of the instant dispensing operation; said lever 130 being inoperative to advance the serial number except when released by the initial rotary movement of the shaft 45 at the beginning of each dispensing operation, as hereinafter described.

Said shaft 108 has rigidly connected therewith the gear 140 which, as shown in Fig. IV, is in mesh with the eight toothed gear 141 which is loosely journaled on the shaft 111 and engaged with the gear 144 which is loosely journaled on said shaft 116. Said gear 144 carries the decimally numbered type wheel 145' which is the unit wheel of a series of three serial number printing wheels, the other two being marked 145 in Fig. IV. Said wheel 145' carries at the upper side thereof in Fig. IV two gear teeth 146 which are adapted to successively engage the eight teeth on the gear 147 which is loosely journaled on said shaft 111 and in mesh with the gear 148 on the type wheel 145 adjoining the wheel 145'. Every other tooth on said gear 147 is axially extended so that what is the lower end of said gear in Fig. IV presents but four teeth in registry with the cylindrical edge 145'' on said wheel 145', so that said wheel 145 is prevented from turning by engagement of two of the four long teeth upon said cylindrical edge except when the wheel 145' presents its two teeth to turn said gear 147. Said wheel 145 is connected with the other wheel 145 shown in Fig. IV by a gear like the gear 147 loosely mounted on said shaft 111 so that whenever said shaft 108 shown in Fig. III is turned to the extent of one tooth of said ratchet wheel 122, by the operation of the cam lever 130, the serial number presented by the group of three wheels 145', 145 and 145 shown in Fig. IV is advanced one digit.

However, in the position shown in Fig. II, said lever 130 is prevented from rising to its upper limit under stress of said spring 132 by the gear sector 150, shown in Fig. III, which is pivoted on the pin 151 at the lower end of said lever 130 and stressed upwardly by the spring 152 connecting said sector with the stud 153 on said lever 130; so that said sector is in mesh with the gear 154 on the shaft 111. Said shaft 111 is journaled in the opposite plates 112 and 113 of the frame 104 and has at its end shown in Fig. V, which is opposite to that shown in Fig. III, the ratchet wheel 156 by which said shaft 111 is turned, to insure the alinement of the printing faces on the number wheels 115', 115 in proper printing position. Such turning movement is effected by the evolute cam 158 which is rigidly connected with said shaft 137, as shown in Fig. V. Said cam 158 operates upon the upper arm of the lever 159 shown in Fig. V which is loosely journaled on said shaft 108 between the side plate 113 and the collar 160 fixed on said shaft 108. Said lever 159 carries on its pin 161 the pawl 162 for engagement with the four teeth on said ratchet wheel 156. The movement of said pawl is limited by the pin 163 carried by said lever 159 which extends in the slot 164 in said pawl. Said lever 159 and its pawl 162 are normally upheld in cooperative relation with said cam 158 by the spring 165 extending from said lever 159 to the stud 166 on said frame plate 113.

Said side members 112 and 113 of the frame 104 support two rods 168 and 169, as indicated in Fig. IV. Said rods support the packet carriage 170 which contains said throat 19 through which the packet 21 is inserted as indicated in Figs. II and III. Said carriage may be reciprocated to and from the extreme positions shown respectively in Figs. II and III, such movement being limited by slots 171 in said carriage 170 through which said rods 168 and 169 extend. Such movement shifts the packet 21 to alternately imprint it in alinement with the index pointers 38 and 39 shown in Fig. IX, and is effected by rotation of the crank shaft 137 provided with said crank handle 138.

To alternately detain said carriage in its two printing positions, I provide its side flange 173 with two notches 174 which alternately receive the detent stud 175 which extends through the vertical guide slot 176 in the frame plate 112. Said stud is carried by the link 178 hanging from the pivot 179 on the detent lever 180 which is fulcrumed on the bolt 181 fixed on said plate 112. The spring 182 extending from the screw 183 on said frame plate 112 to said lever 180 continually holds it in cooperative relation with the cam 184 fixed on said shaft 137, by which said detent 175 is raised and lowered with respect to said notches 174.

Said shaft 137 has, rigidly connected therewith, oppositely counterpart cams 186 which engage in openings 187 in rocker frame members 188 and 189, shown in Fig. IV, which are levers fulcrumed on the shaft 190 which is journaled in said side plates 112 and 113 of the frame 104. The rock shaft 191 is journaled in the free ends of said rocker members 188 and 189 and carries thrust arms 192 and 193 having respective cranks 192' and 193' overhanging the similar cam inclines 195 on said carriage 170, as indicated in Figs. II and III. Said crank 192' is connected by the spring 196 with the stud 197 on said frame 104 so as to continually stress said crank arms toward the vertical position shown in Fig. II when they are released. In that position said crank arms overhang the left hand slopes of the inclines 195 so that upon rotation of said crank handle 138 and cams 186 clockwise, said arms 192 and 193 are forced outwardly by traverse down said slopes to thrust the carriage from the position shown in Fig. II to the position shown in Fig. III. Further turning movement of said handle 138 lifts said rocker members 188 and 189, releasing said thrust arms from said inclines 195 permitting them to be swung by their spring 196 back to vertical position; so that further turning movement of said handle 138 causes the cranks 192', 193' on said thrust arms to slide down the right hand slope of said inclines 195 and thrust said carriage 170 to the right to the initial position shown in Fig. II.

Said carriage 170 has at the left hand end thereof in Figs. II and III the stationary shaft 199 which is the fulcrum for the punch frame 200 by which the punch pin 33 is alternately lifted clear of the packet 21 and thrust through said packet; such movement being effected by said rock shaft 191 alternately engaging the bifurcations 202 and 203 on said frame 200, which extend respectively above and below said shaft, as shown in Figs. II and III.

Said carriage 170 has the packet supporting web 170' overhanging said stationary shaft 116 and has the guide plate 204 conveniently secured to the carriage by the screws 205 shown in Fig. IV to guide the inner end of said packet 21 into proper position with respect to said carriage; the left hand edge of said plate 204 shown in Fig. IV being upturned to insure that the inner end of the packet shall pass beneath it from the throat 19.

Said shaft 190 is rigidly connected with the arm 207 shown at the upper portion of Fig. IV, which carries the roller 208 in cooperative relation with said evolute cam 158 on said shaft 137 and said arm 207 is connected by the spring 209 with the stud 210 on the side plate 113 of said frame 104 so that as said shaft 137 is turned, said arm is alternately thrust clockwise by its roller 208 engaging said cam 158, and released as the crest 158' of said cam passes beneath said roller. Said shaft 190 is also rigidly connected with the cross head 211 which, as shown in Fig. IV, overhangs the supporting arms 212 of the platen 213, which arms are journaled on said shaft 190. Said platen is connected with the arm 211' of said cross head by the spring 214 so that said platen is lifted by that spring when said cross head 211 is uplifted by the cam 158, but when said cross head is released by the crest 158' of said cam passing clockwise beneath said roller 208, said cross head is snapped counter-clockwise downward until it is stopped by its arm 211' encountering the upper surface of said shaft 137; with the effect that said platen, knocked down by the cross head, stretches its spring 214 and strikes a hammer blow upon the packet 21 causing the latter to be imprinted by the number type wheels beneath it, but said platen is thereafter instantly uplifted to the position shown in Fig. V by the tension of said spring 214.

It may be observed that the complete gear 154, shown in Figs. VI and VII, as part of the detent mechanism by which advance of the serial numbering device is prevented when the incomplete gear 150 is in mesh with said gear 154, is operatively connected with the drivable element 45, shown at the bottom of Fig. III, so so to be continuously turned when that element 45 is turned by the passage of liquid dispensed through the meter in the casing 3 shown in Fig. I. The connecting means between said element 45 and the gear 154 include the shaft 102 indicated in the middle of Fig. III, the bevel gears 105 and 106 there indicated, the spur gear 109, carried by said bevel gear 106, as indicated in Fig. IV, and loosely journaled therewith on the shaft 108, and the spur gear 110 which is in mesh with said gear 109 and fixed on the shaft 111 upon which said complete gear 154 is fixed. Therefore, said gear 154 is held stationary by its connection with the meter when there is no liquid being dispensed through the latter. The spring 152 which is pivotally connected at its respectively opposite ends with said sectoral gear 150 and the actuating lever 130 as shown in Figs. VI and VII, extends transversely to the pivot 151 on said lever 130 carrying said sectoral gear 150, and affords snap movement of said sectoral gear in alternately opposite directions, with reference to said lever 130, and toward and away from said complete gear 154, in accordance with the relation of said spring to said gear pivot 151; the extreme positions of said sectoral gear 150 being indicated respectively in Figs. VI and VII. Said incomplete gear 150 is snapped by said spring 152 from the position shown in Fig. VI to the position shown in Fig. VII when the manually actuated cam 136 is turned from the position shown in Fig. VI to that shown in Fig. VII, forcing the left hand side of said incomplete gear 150 against the abutment stud 228, shown in Figs. II, VI, and VII, which is fixed on the frame 112, as shown in Fig. II. Said gear 150 is snapped by said spring 152 from the position shown in Fig. VII to the position shown in Fig. VI, when the manually acuated cam 136 is upturned to the position shown in Fig. VI and the sectoral gear 150 is released from engagement with the gear 154 by rotation of the latter in the direction of the arrow shown in Fig. VI, at the initiation of a dispensing operation of the meter.

The mechanism above described is operated as follows: The dispensing apparatus being idle and the meter registering and printing recording mechanism being in the initial position shown in Fig. I, the operator uplifts the door 17 from the position shown in Fig. I to the position shown in Fig. II and inserts a blank packet 21 through the throat 19 as indicated in the latter figure, until the right hand end of the packet 21 extending beneath the guide plate 204 is stopped against the right hand end of the carriage 170, as indicated in Fig. III. Thereupon, the operator drops the door 17 from the position shown in Fig. II to the closed position shown in Figs. I and III. Thereupon, the operator turns the crank handle 138 clockwise from the position shown in Figs. I and II to the position shown in Fig. III and thereby shifts said carriage 170 to the left in the latter figure and causes the punch 33 to move from the position shown in Fig. II to that shown in Fig. III and thereby impale the packet 21 in stationary position with respect to said carriage 170. That punching operation is effected before the handle 138 has made a quarter of a revolution. The operator continues to turn said handle 138 and just before it reaches the vertical position the crest 158' of the evolute cam 158 by which the cross head 211 and platen 213 have been upheld in the position shown in Fig. II passes the roller 208 and permits the cross head to drop and strike down the platen to impress said packet 21 upon the type wheels beneath it and imprint on said packet the "Previous sale No." indicated by the pointer 36 in Fig. IX and the "Gallon reading—Start" indicated by the pointer 38 in Fig. IX. As above noted, the arm 211' of the cross head encounters the upper surface of said shaft 137 in its downward movement so that the platen stretches its spring 214 to strike the hammer blow upon the packet 21, and said platen is thereupon instantly uplifted to the position shown in Fig. V by the tension of said spring 214. The operator having turned said handle one complete revolution, starts the dispensing mechanism in operation and the initial movement of the shaft 45 shown in Fig. III turns the gear 154 counterclockwise by its shaft 111 to release the gear sector 150 from the position shown in Fig. III to the position shown in Fig. VI, thereby permitting the spring 132 to uplift the cam lever 130 to the position shown in Fig. VI and thereby cause the pawl 123 to engage the next tooth on the ratchet wheel 122, as shown in Fig. VI. When the dispensing operation is completed, the operator turns said handle 138 another revolution. That operation first causes the cam 136 to thrust the cam lever 130 downward from the position shown in Fig. VI to the position shown in Fig. VII, thereby turning said ratchet wheel 122 and its shaft 108 to the extent of one tooth from the position shown in Fig. VI to the position shown in Fig. VII, thus advancing the serial number printing mechanism the extent of one digit. Turning movement of said crank handle 138 next shifts the carriage 170 from the position shown in Fig. III (in which the first impression was made by the platen as above noted), to the position shown in Fig. II, and next causes the platen to strike a second impression upon the packet 21 to imprint "Your sale No." indicated by the pointer 37 in Fig. IX and "Gallon reading—Finish" indicated in that figure. Turning movement of said handle 138 from the position shown in Fig. III to the position shown in Fig. II, (to complete such second revolution thereof,) uplifts the punch pin 33, and thus frees the packet so that it may be removed when the operator uplifts said door 17 from the position shown in Fig. III to the position shown in Fig. II.

When the operator terminates the dispensing operation, which operation actuates the gallonage printing wheels 115', 115, by said shaft 111; farther accurate turning movement of said shaft 111 to aline the advanced type on the tenths wheel 115' in proper printing position, regardless of where it is left by termination of the dispensing operation, is effected by the ratchet wheel 156 and pawl 162 shown in Figs. V and VIII, as said handle 138 is manually turned. As shown in Fig. V said pawl 162 is thrust down, to precisely position the advanced digit type, by said cam 158, and when the crest 158' of that cam releases said pawl 162, as shown in Fig. VIII, the upward idle movement of the pawl lever 159 by its spring 165 is limited to less than the space of one tooth on the ratchet 156, by said lever encountering the stop stud 159' which is fixed on the frame plate 112; thus limiting that adjustment to less than one tenth gallon.

Thereupon, the operator inserts by hand the number of "gals. delivered" in the space indicated by the pointer 40 in Fig. IX, separates the sheet 23 from the packet, and delivers it to the customer as the latter's receipt. The operator then files the other sheets 24 and 25 among the records of the seller.

Said arm 59 also carries, loose on the shaft 57, the change gear 215 which is rigidly connected with the gear 56 but is turned idly in the position shown in Fig. XI. Said gear 63 on the shaft 64 also meshes with the change gear 217 which turns freely on the shaft 218 which is radially adjustable in the slot 219 of the arm 220 in which it may be adjustably rigidly secured by the nut 221. Said arm 220 is split at 223 so that it may be clamped by the screw 224 on said bearing 65 on said frame 52. Said arm 220 also carries, loose on the shaft 218, the change gear 225 which is rigidly connected with the gear 217 but is turned idly in the position shown in Fig. XI. However, both arms 59 and 220 may be loosened and adjusted, counterclockwise, on their respective bearings, to bring said change gears 215 and 225 into mesh with each other, and move the gear 56 out of mesh with the gear 63, to change the ratio of movement of said shaft 64 by the shaft 59 and meter shaft 45, to effect the proper movement of the volume registering and printing wheels aforesaid in accordance with the volume of fluid dispensed through the meter, by which they are actuated.

Although I have illustrated my invention with reference to register and printing wheels provided with numbers in decimal relation presented upon cylindrical surfaces; it is to be understood that the numbers may have any other convenient relation in accordance with the quantities they indicate and may be presented upon surfaces which are flat or otherwise shaped.

Therefore, I do not desire to limit myself to the precise details of construction and arrangement herein set forth, as it is obvious that various modifications may be made therein without departing from the essential features of my invention, as defined in the appended claims.

I claim:

1. In apparatus having an element driven by successive operations; a serial numbering device; and means for operating said numbering device, to advance said device one digit after each operation; detent means capable of rendering said means for operating said numbering device normally inoperative; and means operatively connecting said driven element with said detent for releasing the latter only upon initiation of each operation of said driven element; whereby operation of said numbering device is limited to one digit advance between successive operations of said driven element.

2. Apparatus as in claim 1; including printing means for recording the serial number of the operation effecting such release, and wherein said means for advancing the numbering device includes a handle, the movement of which also operates said recording means.

3. The combination with a drivable element; of a serial numbering device; a manually actuated cam; actuating means for said serial numbering device biased to unoperated position, and operable by said cam; a complete gear drivable by said element; a sectoral gear normally out of engagement with said complete gear, mounted on said actuating means; means, responsive to operation of said actuating means by said cam, for bringing and maintaining the sectoral gear in geared relation with said complete gear, to hold the actuating means in operated position; said complete gear, upon being driven by said element, driving said sectoral gear out of geared relation to release said actuating means.

4. The combination with a drivable element; a manually actuated cam; actuating means for said serial numbering device biased to unoperated position, and operable by said cam; of a serial numbering device; a complete gear drivable by said element, a sectoral gear, normally out of engagement with said complete gear, mounted on said actuating means; a spring for stressing said sectoral gear toward said complete gear; and means, including said spring, responsive to operation of said actuating means by said cam, for bringing and maintaining the sectoral gear in geared relation with said complete gear, to hold the actuating means in operated position; said complete gear, upon being driven by said element, driving said sectoral gear out of geared relation to release said actuating means.

5. The combination with a drivable element; of a serial numbering device; a manually actuated cam; actuating means for said serial numbering device biased to unoperated position, and operable by said cam; a complete gear drivable by said element, a sectoral gear, pivoted on said actuating means and normally out of engagement with said complete gear; and means, including a spring connecting said actuating means with said sectoral gear, responsive to operation of said actuating means by said cam, for driving and maintaining the sectoral gear in geared relation with said complete gear, to hold the actuating means in operated position; said complete gear, upon being driven by said element, driving said sectoral gear out of geared relation to release said actuating means.

CARLTON L. McMULLEN.